United States Patent [19]
Labeye

[11] Patent Number: 5,923,480
[45] Date of Patent: Jul. 13, 1999

[54] OPTOMECHANICAL MICRODEVICE FOR USE IN OPTOMECHANICAL MICRODEFLECTOR APPLICATIONS

[75] Inventor: Pierre Labeye, Grenoble, France

[73] Assignee: Commissariat a l'Energie Atomique, Paris, France

[21] Appl. No.: 08/832,363

[22] Filed: Apr. 2, 1997

[30] Foreign Application Priority Data

Apr. 18, 1996 [FR] France .................................. 96 04861

[51] Int. Cl.⁶ .................................................... G02B 7/02
[52] U.S. Cl. .......................... 359/814; 359/813; 359/822
[58] Field of Search .................................... 359/813, 814, 359/822, 823, 824, 710, 196, 197, 198, 199, 200, 201, 202

[56] References Cited

U.S. PATENT DOCUMENTS

| | | | |
|---|---|---|---|
| 4,733,944 | 3/1988 | Fahlen et al. ............................. | 359/710 |
| 5,059,008 | 10/1991 | Flood et al. ............................. | 359/196 |
| 5,097,354 | 3/1992 | Goto ....................................... | 359/212 |
| 5,392,157 | 2/1995 | Shih ........................................ | 359/625 |
| 5,734,490 | 3/1998 | Rabarot et al. .......................... | 359/619 |

FOREIGN PATENT DOCUMENTS 0 653 824  of 0000  European Pat. Off. .

OTHER PUBLICATIONS

Patent Abstracts of Japan, vol. 9, No. 190, (P–378), Aug. 7, 1985, JP–60 057546, Apr. 3, 1985.
Optical Engineering, vol. 33, No. 11, pp. 3505–3517, Nov. 1, 1994, M. Edward Motamedi, "Micro–Opto–Electro–Mechanical Systems".
Optical engineering, vol. 33, No. 11, pp. 3616–3623, Nov. 1, 1994, M. Edward Motamedi, et al., "Miniaturized Micro–Optical Scanners".
Optical Engineering, vol. 32, No. 11, pp. 2665–2670, Nov. 1, 1993, Edward A. Watson, "Analysis of Beam Steering with Decentered Microlens Arrays".
Proceedings of the SPIE: Design Modelling and Control of Laser Beam Optics, vol. 1625, pp. 78–83, Jan. 21 to 23, 1992, Tom D. Milster, et al, "Modelling and Measurement of a Micro–Optic Beam Deflector".
Mellies Griot, Gradient Index Lenses, 3 pages.
App. Phys. Lett., vol. 59, No. 27, pp. 3519–3520, Dec. 30, 1991, N. Mermilliod, et al., "LaMgAl$_{11}$O$_{19}$:Nd Microchip Laser".
Database WPI, Derwent Publications, AN 96–499453, FR 95–005652, May 12, 1995.

*Primary Examiner*—Georgia Epps
*Assistant Examiner*—Suzanne Letendre
*Attorney, Agent, or Firm*—Oblon, Spivak, McClelland, Maier & Neustadt, P.C.

[57] ABSTRACT

The present invention concerns an optomechanical microdevice comprising:

- a stationary section (2) defining a plane (x, y) of the microdevice,
- at least one primary lens (4) capable of moving in the plane of the microdevice and of deflecting a beam of light in the same plane,
- at least one fastening arm (6) joining the primary lens to the stationary section, one part of the arm being capable of moving and of moving the movable lens in the plane of the microdevice.

22 Claims, 8 Drawing Sheets

OPTOMECHANICAL MICRODEVICE FOR USE IN OPTOMECHANICAL MICRODEFLECTOR APPLICATIONS

FIELD OF THE INVENTION

The present invention is related to the field of microoptical components and microtechnology, particularly the field of optomechanical microdeflectors for use in the manufacture of compact microsystems.

More specifically, the invention may be used in a wide variety of applications such as optical microtelemetry systems (micro-LIDAR systems) for detecting obstacles, optical communication and interconnection systems, optical data storage systems, optical sensors, and optical printing systems such as laser marking and printers, etc.

Another aspect of the invention concerns the application of scanning or deflection to a measurement, of a light beam from a proximate light source using a system of one of more microlenses, displacement of at least one of such lenses being controlled by the bending of a fastening arm.

BACKGROUND OF THE INVENTION

It is known in the art to use various types of miniature integrated or hybrid systems using various mechanisms or components to deflect a beam of light.

A first system comprises one or more rotating or oscillating mirrors. The reflection of a light beam on a rotating mirror is used to achieve high scanning speeds. This type of system is often very sensitive to acceleration, which is a drawback, particular in on-board laser telemetry applications.

Some deflection devices use networks of microlenses. Examples of this type of system were described by E. A. Watson in "Analysis of beam steering with decentered microlens array" in Optical Engineering, November 1993, vol. 32, No. 11, pages 2665–2670 and in T. D. Milster et al. in SPIE, vol. 1625, "Design, Modeling and Control of Laser Beam Optics", 1992, pages 78–83. These systems use the deviation caused by a disalignment of the optical axis of a moving system of microlenses or network of microlenses. This type of device cannot be used to produce a highly-integrated microdeflector.

Most light microdeflector systems use piezoelectric components to control the movement of the moving parts. This has the drawback that such components are often bulky and are thus limited to low frequencies. The piezoelectric components also require very high control voltages (in the region of 1,000 volts) which make it difficult to attain high frequencies without excessively high power consumption. Another drawback of high voltages lies in the cost of power supplies that are difficult to miniaturize.

A different system was described in French patent application FR-A-95 05652. This document describes a microscanning device that uses microlenses and electrostatic struts integrated on a substrate. The axis of the microlens is perpendicular to the substrate on which it is fabricated. The device presented in said document is advantageous in situations where microscanning of a beam in two directions is required. However, where microscanning of a beam in a single direction is required, a more simply-made device could be found, giving a cheaper system. Moreover, the technique described in FR-A-95 05652 does not allow for making all types of lenses, particularly lenses with a very short focal length used to give wider scanning angles. Nor does it allow for lower control voltages for equivalent scanning angles. Finally, the device described in application FR-A-95 05652 enables lenses to be stacked along an axis but does this by crossing two microstruts at 90° on two levels. It is therefore sometimes necessary to displace an entire series of microlenses all together.

The document U.S. Pat. No. 5,097,354 describes a hybrid device comprising a point light-source, a lens and a mechanism for displacing the lens or the light-source. This device requires assembling the mechanical component on a support of the light-source and the lens on the mechanical component. The optical system must be mounted very accurately on the mechanical component. This type of device in which a lens is mounted on a mechanical structure is described as "hybrid" and requires alignment and assembly operations that are incompatible with mass production.

SUMMARY OF THE INVENTION

It is an object of the present invention to solve these problems and to provide an optomechanical microdevice comprising:
- a stationary section defining a plane of the microdevice,
- at least one primary lens capable of moving in the plane of the microdevice and of deflecting a beam of light in the same plane,
- at least one fastening arm joining the primary lens to the stationary section, one part of the arm being capable of moving and of moving the movable lens in the plane of the microdevice.

The lenses used in the present invention have at least one optical axis (also known as focal axis) in the plane of the substrate (or plane of the microdevice) or in a plane parallel to that of the substrate. Since, moreover, the structure of the microdevice of the invention can be made using photolithographic and engraving techniques, the form of the diopters of the microlens is not restricted in any way; they may be of any shape, particularly cylindrical. In this latter situation, the lens has an axis of cylindrical symmetry perpendicular to the plane of the microdevice. The cross-section of a diopter in a plane perpendicular to the axis of cylindrical symmetry may therefore be circular, conical, quadric or of any other shape.

The structure of the device according to the present invention is compatible with methods of mass production, for example engraving and photolithography using masking techniques. In particular, when the lens is cylindrical in shape, the optics, the deflectable supporting arms and any electrostatic combs may be engraved in a single operation: the movable lens or lenses, together with the fastening arm or arms, are fabricated as part of the stationary section. This produces a highly-integrated, greatly miniaturized device that has better mechanical resistance than devices composed of assembled parts. The device is easier to produce, and therefore cheaper, than devices that cannot be mass-produced. Finally, this type of device presents no alignment problems; hybrid systems known in the art require alignment and assembly operations and are usually more voluminous.

No structure in the known art enables a microdevice to be made in which the lens is integrated into the mechanical structure and whose optical axis is in the plane of the microdevice. This is made possible in the present invention by making the lens cylindrical in cross-section.

The ability to create any shape of cylindrical lens also makes it possible to produce perfectly stigmatic lenses, even for very wide beam openings. There are thus no limitations, either of focal length or of opening.

Focal lengths may be smaller than those of devices using the known art and deflection of the optical beam may be greater for a given displacement. A given deflection may equally be achieved using smaller displacements than those used in the known art, thereby using less control energy.

Moreover, the lens may be divergent.

The optomechanical microdevice of the invention may also include at least one secondary lens located in the trajectory of the incident light beam. This secondary lens may be secured by being fastened to the stationary section of the microdevice. It may also be a movable lens capable of deflecting the light beam in the plane of the microdevice and also fastened by means of at least one fastening arm to the stationary section. One part of this arm may be capable of moving and of moving the secondary movable lens in the plane of the microdevice.

If the beam to be deflected is very wide, it is possible to build a system in which N movable primary lenses are disposed side by side. The microdevice may also include N secondary stationary or movable lenses disposed side by side in the plane of the microdevice. It is therefore possible to make lenses with very short focal lengths that are capable of achieving significant deflection using small displacements.

To obtain lenses with very short focal length, or to overcome optical aberrations, N movable primary lenses may be stacked along an axis lying within the plane of the microdevice to give significant deflection using only small displacements.

If the sensitivity of the movable component to acceleration needs to be reduced, the mass of the optical section of the microdevice may reduced using a Fresnel lens.

The microdevice of the invention is very well suited to deflecting a beam from an optical guide or an optical fiber.

In particular, the stationary section of the microdevice may also include means for directing a beam of light in the direction of the primary movable lens or lenses, or the secondary lens or lenses.

These means may comprise an optical microguide built into the stationary section with an output end disposed opposite the primary movable lens or lenses, or the secondary lens or lenses.

In a variant of the invention, these means may comprise an optical fiber fastened to the stationary section of the device, with an output end disposed opposite the primary movable lens or lenses, or the secondary lens or lenses.

Lastly, a microlaser may be fastened to the stationary section so that the laser beam is emitted in the direction of the primary movable lens or lenses, or the secondary lens or lenses. This produces a highly-integrated type of microdevice.

The fastening arm connecting the movable lens to the stationary section of the device may be joined at both ends to the stationary section of the microdevice and have an intermediate section to which the lens is connected. This intermediate section is flexible enough to enable the lens to move in the plane of the microdevice. This type of structure makes the entire microdevice assembly more robust.

Means for controlling the displacement of the fastening arm and the movable lens may be provided. These means may, for example, be electrostatic or electromagnetic. In one variant these control means may comprise an electrostatic comb.

BRIEF DESCRIPTION OF THE DRAWINGS

The characteristics and advantages of the invention will be better understood in the light of the following description. The description concerns examples of embodiments that are given for explanatory purposes and are not intended to be restrictive. The description refers to the attached drawings where.

DETAILED DESCRIPTION OF EMBODIMENTS OF THE INVENTION

Figure 1A:
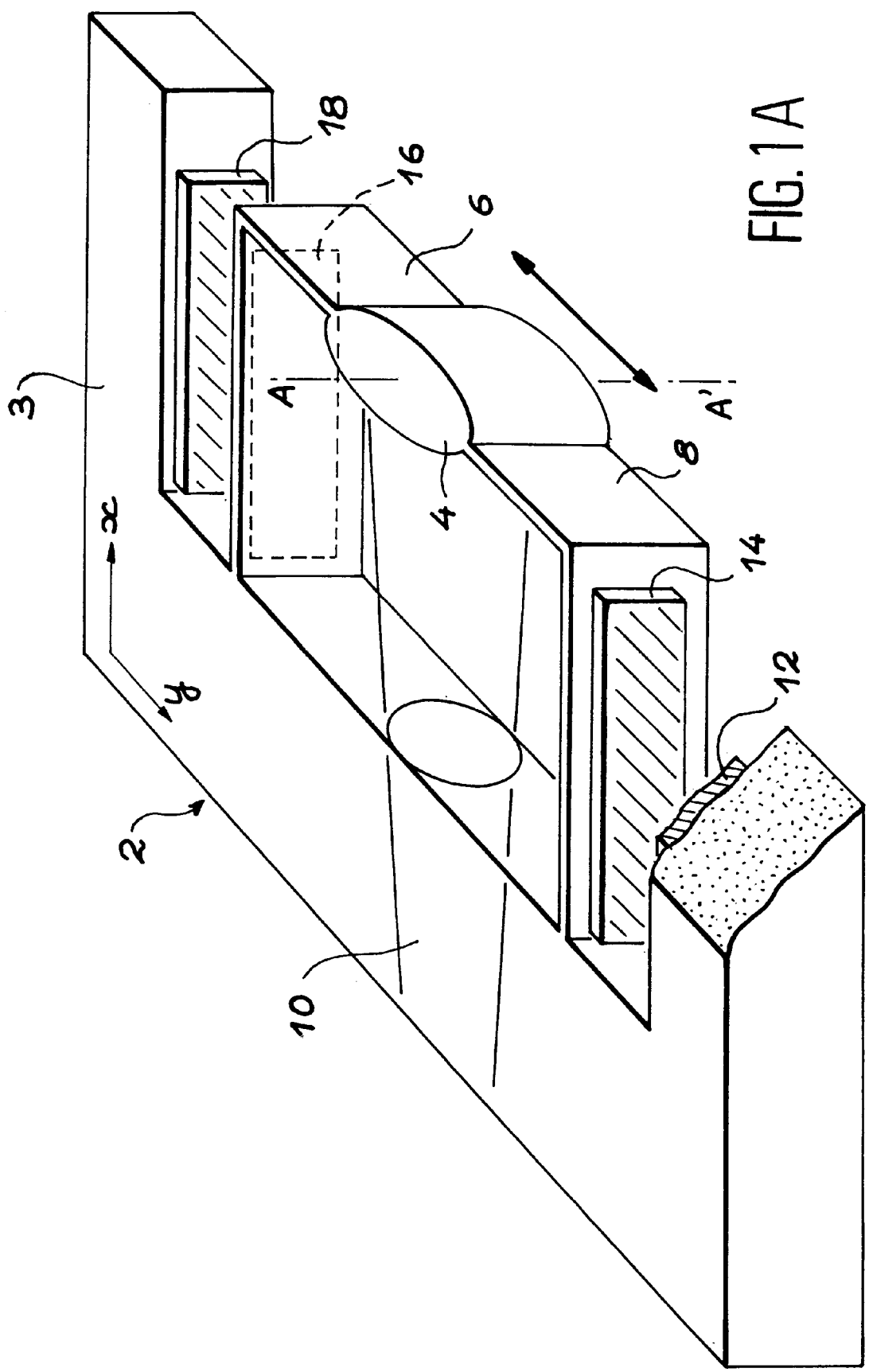
FIGS. 1A and 1B show two variants of a first embodiment of the invention.

A first embodiment of the invention is shown in FIG. 1A. The microdevice comprises a substrate, or stationary section, 2, and a movable lens, 4. The substrate or its surface, 3, defines a plane, xy, hereafter referred to as the plane of the microdevice. Microlens 4 can move in direction y, and consequently in the plane of, or in a direction parallel to, the plane of the microdevice. The lens is connected by means of arms 6, 8 to stationary section 2. As a result of an acceleration in direction y or a force exerted by an external control system, arms 6, 8 may be displaced, thereby allowing microlens 4 to move in direction y. Movement of the arms is due to bending of the arms as a result of an acceleration or external force.

When a point source is located at the focal point of a convergent lens, the beam is collimated by the lens in a direction parallel to its optical axis. When the lens is transversally displaced by a distance d, the beam is then collimated in a direction that is at an angle to the previous direction. This angle $\alpha$ is expressed as $\alpha = \text{Arctg}(d/f)$.

Means 10 such as an optical microguide are also provided to introduce a beam 5 traveling in direction x, or in a direction parallel to direction x, in the direction of microlens 4. Displacement of the microlens in axis y deflects this light beam in the plane of the microdevice, or in a plane parallel to the plane of the microdevice. The lens is shown as cylindrical in FIG. 1A. It has an axis AA' of cylindrical symmetry that is perpendicular to plane xy of the microdevice. Each diopter presents a finite curvature in plane xy, or in a plane parallel to xy, but no curvature in a plane perpendicular to xy.

A lens defined by spherical diopters may also be used, the focal axis of the lens then being parallel to axis x.

Although two fastening arms are shown, the device can also operate with only one fastening arm, for example arm 6. For reasons of symmetry and stability the device with two arms 6, 8 disposed on either side of lens 4 is preferable. Moreover, two arms allow for linear displacement of the microlens.

In a microdeflector means for controlling the displacement of arms 6,8 and thus lens 4 may be provided. Such means may, for example, as shown in FIG. 1A, be electrostatic. Control electrodes 12, 14, 16, 18 may be disposed on the lateral sections of arms 6, 8 and on the stationary section of the device. These electrodes are connected to means for energizing (not shown in the figure). Applying a voltage to facing electrodes 12, 14 causes displacement of the assembly in direction y. Other control means may be provided, in particular electromagnetic means. In this case a magnetic field B is directed perpendicularly to the plane of the microdevice. windings along arms 6, 8 are energized by a power supply. The magnetic field generates a Laplace force $F_L$ that causes the movable section of the microdevice to move in axis y. Other details, in particular for an embodiment of such a device, are given in French patent number FR-2 660 444.

In an electrostatically-controlled device the force of electrostatic attraction generated by a voltage V applied between two electrodes 12, 14 disposed facing each other is given by:

$$F = 1/2 \epsilon_0 S (V/e)^2 \quad (1)$$

where F is the force generated, $\epsilon_0$ the permittivity of the medium between the electrodes, S the surface of the electrodes and e the distance between the electrodes.

Conversely, in an arm of length L, with a moment of inertia I, made of a material with a Young's modulus E, the displacement d induced by a force F distributed along the length of the arm is given by:

$$d = \frac{FL^3}{8EI} \quad (2)$$

Depending on the displacements required, a specialist in the trade can deduce from equations (1) and (2) the dimensions of the arms and the electrostatic control device to be used. Equation (2) is applicable irrespective of the means of control used.

Figure 1B:
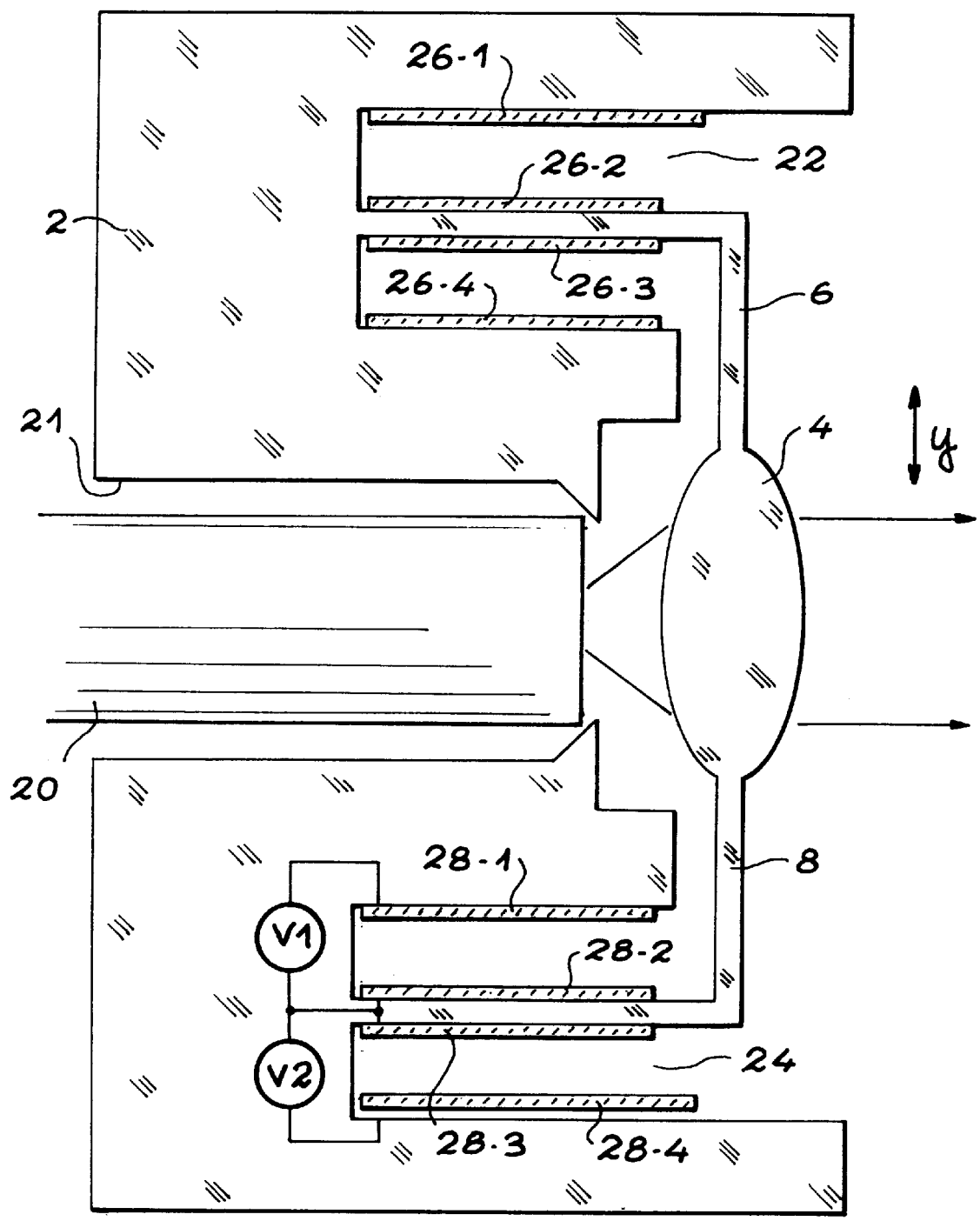

FIG. 1B shows a variant of the device described above with reference to FIG. 1A. Optical microguide is replaced with an optical fiber 20 that is incorporated into a groove 21 provided in the stationary section of the microdevice. Groove 21 has the advantage of positioning the fiber 20 excellently in relation to the lens 4. The ends of arms 6, 8 attaching said arms to the stationary section of the microdevice fit into openings 22, 24 in the stationary section. Electrodes 26-2, 26-3 and 28-2, 28-3 may be disposed on each side of arms 6, 8 such that each of these electrodes is facing a control electrode 26-1, 26-4 and 28-1, 28-4 disposed on the stationary section. A voltage can be applied between each pair of facing electrodes making it possible to reduce the voltage that needs to be applied to each pair of electrodes for a given displacement of microlens 4 along axis y. The means of providing the power supply are thus reduced.

Figure 2:
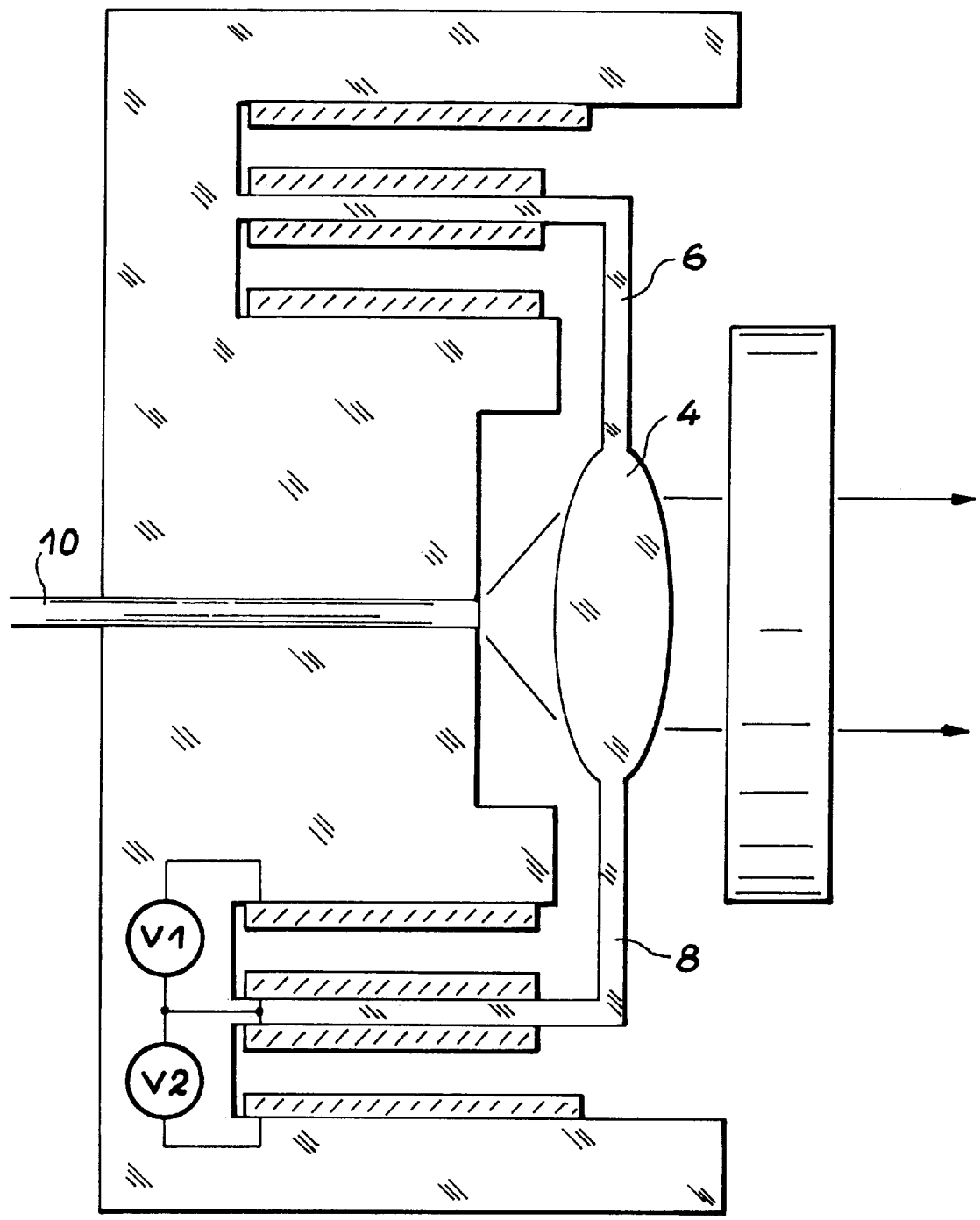
FIG. 2 shows another embodiment of the invention including an optical guide.

The device shown in FIG. 2 comprises, like the first embodiment described above, an optical guide 10 that directs the light towards a cylindrical lens 4. Means of controlling arms 6, 8 are similar to those described above in relation to FIG. 1B. At the output of the device is disposed a cylindrical lens 30 whose axis of cylindrical symmetry is perpendicular to that of lens 4 (i.e. lying in plane xy). Lens 30 collimates the beam obtained with lens 4 in a second direction perpendicular to the plane of the microdevice.

The optical guides shown in FIGS. 1A and 2 are straight guides. They may, however, be incorporated into a complex integrated optical scheme, e.g. an integrated optical interferometer. In this situation, where there is no need to include integrated optical functions, an optical fiber 20 incorporated into a groove 21 can be used as in FIG. 1B.

Figure 3:
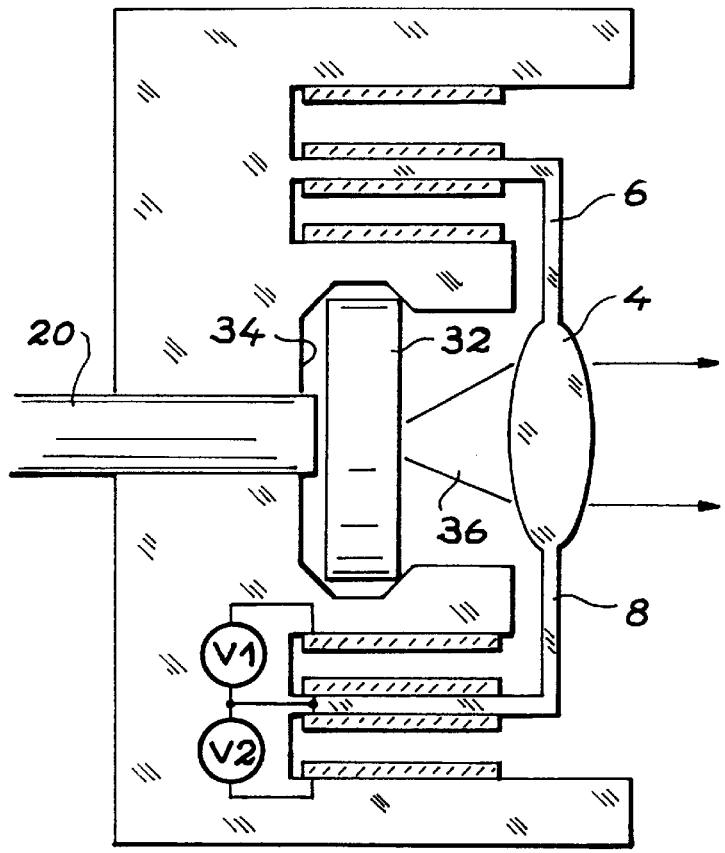
FIG. 3 shows an embodiment of the invention including a built-in laser.

In the device illustrated in FIG. 3, an optical fiber 20 carries a pumping beam to a microlaser 32 housed in a cavity 34 in the stationary section of the microdevice. This microlaser is disposed to emit a laser beam 36 in the direction of movable microlens 4 whose displacements are controlled, for example, by electrostatic means placed along arms 6, 8. A microlaser has a structure consisting of a stack of multilayers. The active laser medium consists, for example, of a thin layer of material (between 150 $\mu$m and 1 mm) of very small size (a few square millimeters) on which dielectric mirrors are disposed, thereby creating a microlaser cavity. The active medium may be pumped by a III-V diode laser which, for the purposes of the present invention, is coupled to the microlaser by the optical fiber 20. Microlasers offer the possibility of series production using microelectrical means which would allow for mass production at very low cost. Consequently a device built according to the invention, particularly a microdeflector, would be extremely compact and relatively low in cost. For example, a microlaser is described in an article by N. Mermilliod et al. entitled, "LaMgAl$_{11}$O$_{19}$:Nd microchip laser", published in Applied Physics Letters, vol. 59 No. 27, pages 3516–3520 (1991).

Another type of microlaser that can be used in the context of the present invention is described in document EP-A-0 653 824. This microlaser has a passive triggering system and incorporates a thin film of saturable absorbent material deposited directly on the solid active medium to constitute a saturable absorber. A procedure for making this type of component is also described in document EP-A-0 653 824.

It is similarly possible to provide a diode laser incorporated, for example in a cavity in the microdevice and disposed so that it directs the laser beam to the movable lens of the microdevice.

Figure 4:
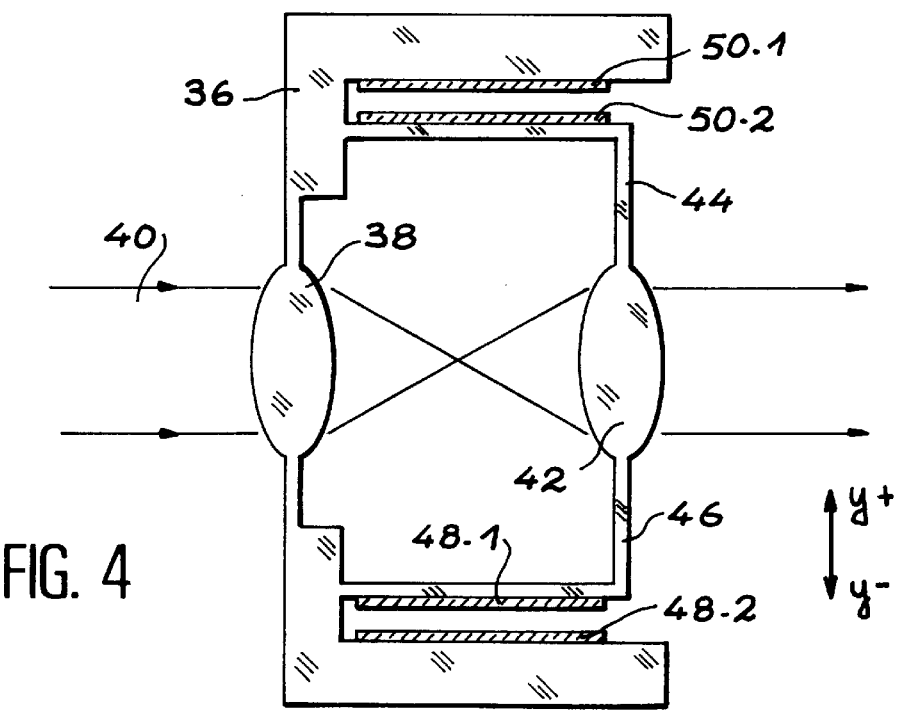
FIG. 4 shows an embodiment of the invention with one movable lens and one stationary lens.

FIG. 4 shows another embodiment of the lens system in a device according to the invention. Stationary section 36 of the device comprises a stationary lens 38 through which an incident beam 40 is passed. The beam leaving lens 38 then passes through a movable lens 42 connected by arms 44, 46 to stationary section 36. The deflection movement is controlled by electrodes 48-1, 48-2, 50-1, 50-2 disposed along the arms and on the stationary section 36 of the microdevice. If a parallel beam 40 is to be deflected, two cylindrical lenses 38, 42, one of which is stationary and the other movable, may, for example, be used. The stationary lens is used to focus the beam parallel while the movable lens recollimates the beam. To deflect the beam towards the bottom of FIG. 4 (i.e. in direction y$^-$), a voltage is established between electrodes 48-1 and 48-2. To deflect the beam towards the top of FIG. 4 (i.e. in direction y$^+$), a voltage is established between electrodes 50-1 and 50-2.

Figure 5:
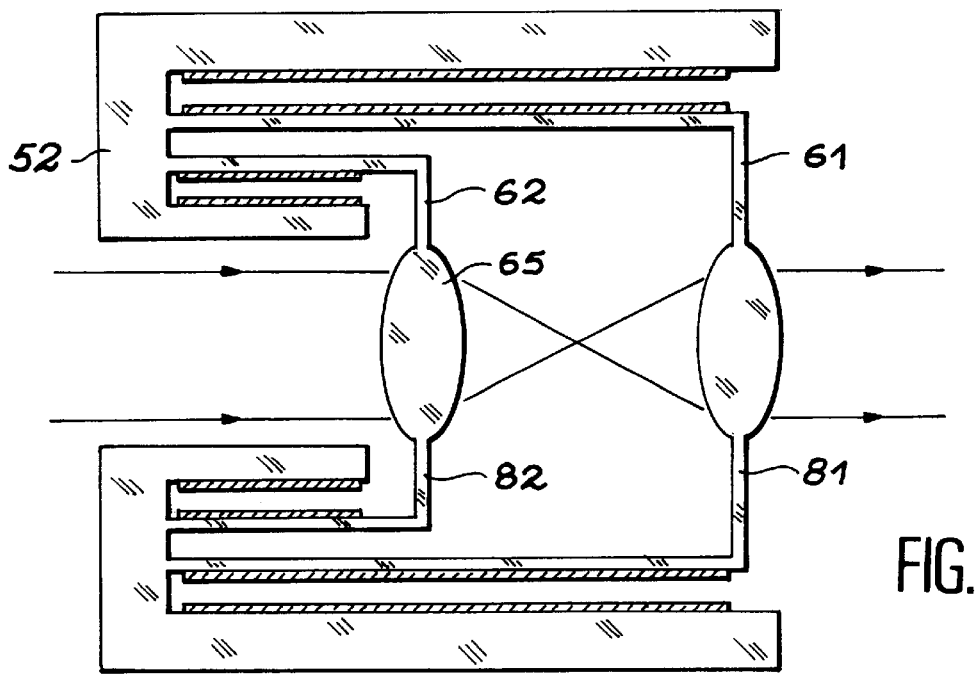
FIGS. 5 and 6 show two variants of an embodiment of the invention with two movable lenses.
Figure 6:
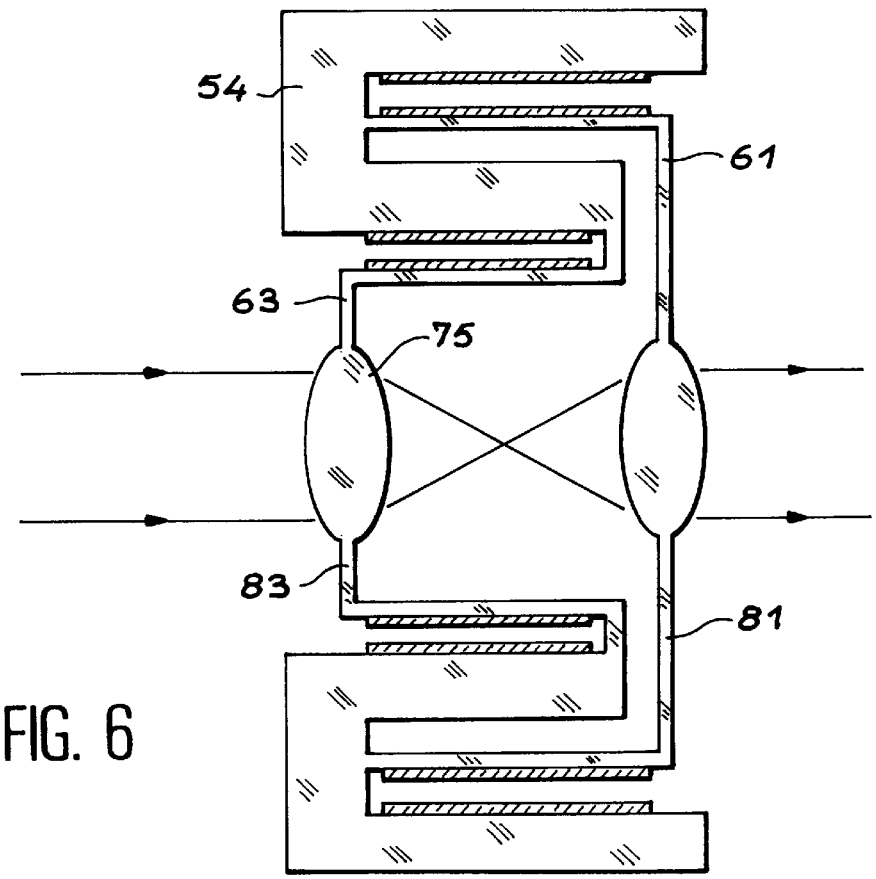

To obtain the same deflection using a lower control voltage applied to the electrodes it is possible to use two movable lenses one behind the other instead of one stationary and one movable lens. In this configuration, in order to obtain the same relative displacement between the two lenses, each lens may be displaced half the distance in opposite directions. This solution is shown in FIGS. 5 and 6. In FIG. 5 the control struts 61, 62, 81, 82 are connected to the same side of stationary structure 52. In FIG. 6 control struts 61, 63 and 81, 83 are connected to opposite sides of stationary structure 54 thereby giving a device with two interlocking movable lenses.

Figure 7:
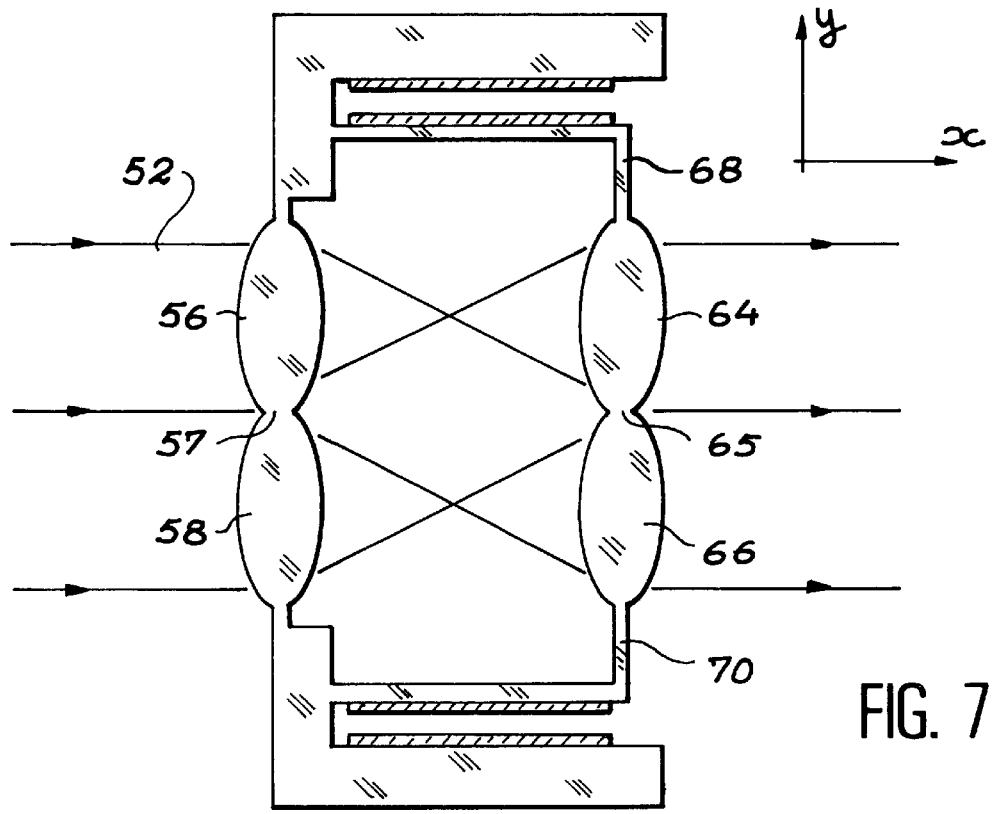
FIG. 7 shows an embodiment of the invention in which movable lenses are placed side by side and stationary lenses are placed side by side.

If the beam to be deflected is very wide it is possible to construct a system where several lenses are mounted side by side. An example of this embodiment is shown in FIG. 7 in which movable and stationary lenses are disposed side by side in direction y of the plane of the microdevice. In this figure an incident beam 52 passes first through a pair of stationary lenses 56, 58 joined by their lateral sections 57, then through a pair of movable lenses 64, 66 joined by their lateral sections 65. Each movable lens is connected to a fastening arm 68, 70 that allows displacement of the two-lens assembly 64, 66. Using this device it is possible to make lenses with a very short focal length that can give significant deflection with only slight displacement. Lenses 56, 58 and 64, 66 have the advantage of being produced in a single stage. The scheme shown in FIG. 7 may be generalized to include any number N of stationary and movable lenses mounted side by side. Similarly where the device only uses movable lenses and no stationary lens it is possible to make an assembly N of movable lenses mounted side by side in a direction that lies in the plane of the microdevice. This gives an assembly of lenses disposed "in parallel".

Figure 8:
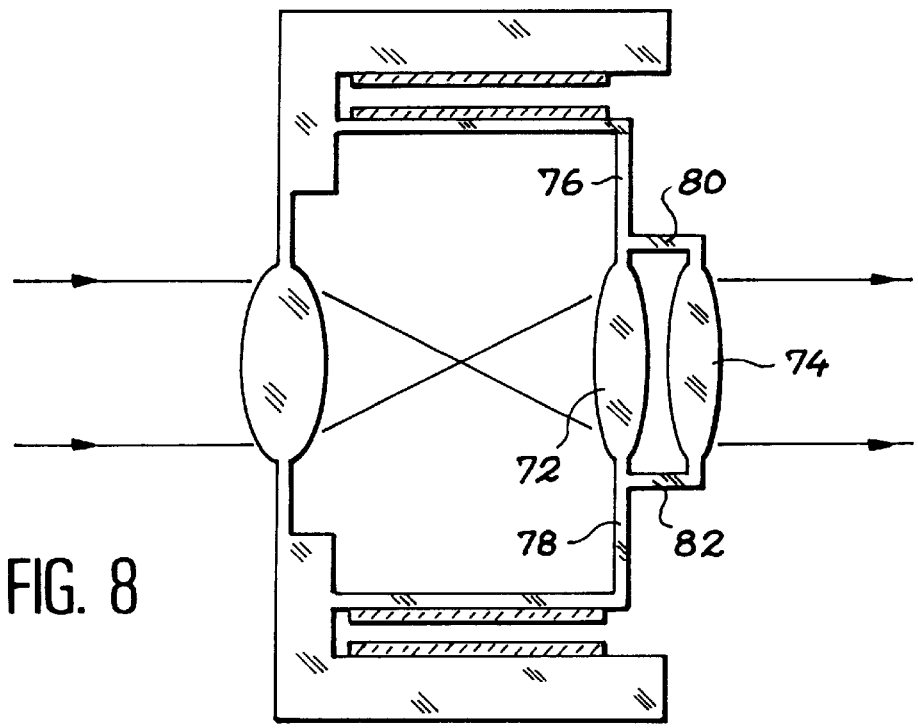
FIG. 8 shows an embodiment of the invention with two stacked movable lenses and one stationary lens.

The embodiment shown in FIG. 8 is a series of movable lenses 72, 74 mounted along an axis included in, or parallel to, the plane of the microdevice (axis x in FIG. 8). The primary lens 72 is connected to the fastening arms 76,78 while the secondary movable lens 74 is connected to arms 76,78 by arms 80, 82. This scheme may be generalized to include any number N movable lenses disposed along an axis of, or parallel to, the plane of the microdevice. By using a series of several lenses in this way it is possible to achieve very short focal lengths and therefore to give significant deflection with only small displacements of the movable section.

Figure 9:
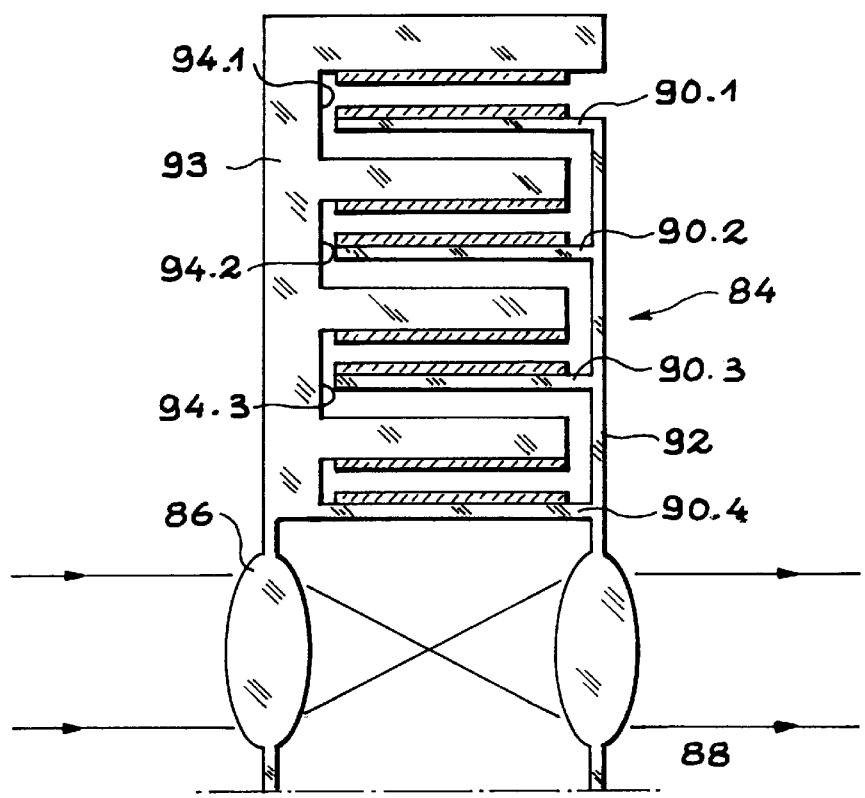
FIG. 9 shows an embodiment of the invention with one movable lens, a stationary lens and an electrostatic comb.

To reduce the control voltage that must be applied to the fastening arms of the movable lens or lenses it is possible to use an electrostatic control comb 84 as shown in FIG. 9. Although only one comb is shown in this figure, a similar comb may be disposed on the other side of the device in relation to stationary and movable lenses 86,88 in the plane of FIG. 9. Comb 84 consists of a series of teeth 90-1 through 90-4 connected to a main arm 92. Each tooth bears control electrodes disposed, for example, on each side of arms 90-i (i=1–4). The stationary section 93 of the microdevice has notches 94-1, 94-2, 94-3 in which teeth 90-1, 90-2, 90-3 of the comb are inserted leaving one end free. Tooth 90-4 is connected to the stationary section. The inner surfaces of the notches in the substrate may be given metal coatings that face metal coatings on the teeth of the comb so that each coated surface of the substrate forms a dielectric condenser of variable thickness with its corresponding metal coating on a tooth of the comb. Only four teeth are shown in FIG. 9 but the art disclosed by the invention may be applied to any number N of teeth.

Figure 10:
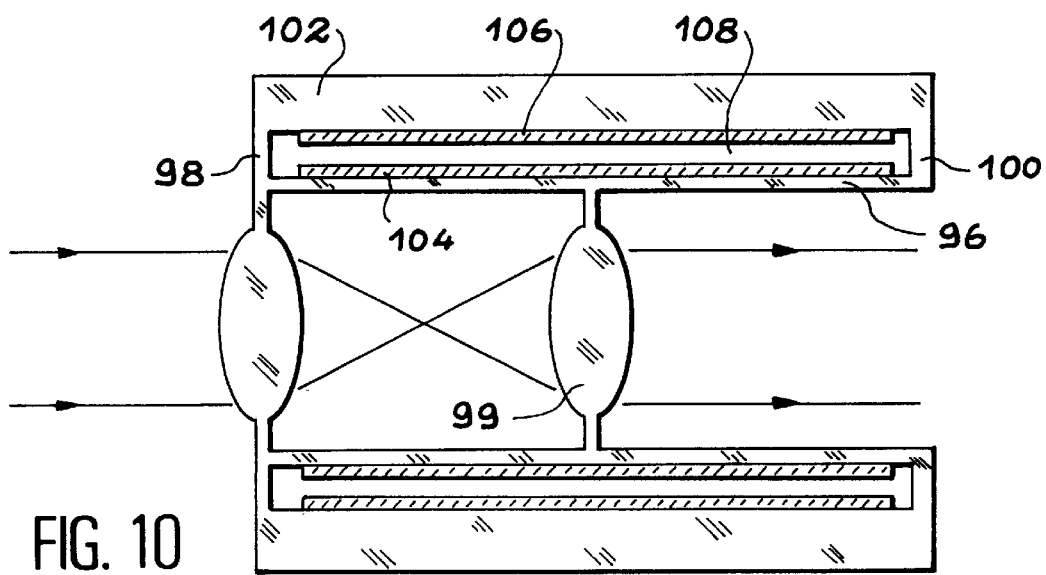
FIG. 10 shows an embodiment of the invention with an arm whose ends are stationary and whose intermediate section is movable.

The fastening arm or arms connecting the movable lens to the stationary section of the microdevice may be designed as shown in FIG. 10: an arm 96 is connected by both ends 98, 100 to the stationary section 102 of the microdevice. The central, or intermediate, section of strut 96 is flexible enough to allow for displacement of movable lens 99 in the plane of the microdevice. Means 104, 106 for controlling the displacement of the intermediate section of arm 96 and movable lens 99 are provided along the surfaces of a cavity 108 separating stationary section 102 and arm 96. These means may be metal coatings that enable an electrostatic force to be applied, or they may be electromagnetic means. Connecting both ends of a fastening arm to the stationary section has the effect of making the entire assembly more robust.

The movable and/or stationary lenses have hitherto been described as being lenses limited by diopters that are spherical or cylindrical or having any other shape. Where the diopters are cylindrical, the diopter may be intersected by a plane parallel to the plane of the microdevice thereby defining a curve that may be a conic (i.e. an ellipse, a hyperbola or a parabola) or a quadric. In the case of a quadric, the lens gives perfectly stigmatic conjugation of images even with very wide beam openings. It can be advantageous to provide several lenses to correct aberrations when deflection is significant.

To reduce the sensitivity to acceleration of the movable section of the device it is possible to reduce the mass of the optical system by using one or two, preferably very thin, Fresnel lenses. This type of lens is described in, for example, "Etude et realisation de systems optiques convergents pour l'optique planaire" (Design and construction of convergent optical systems for plane optics), thesis by Pierre Gidon, Dec. 20, 1983, Scientific and Medical University of Grenoble, France.

Figure 11:
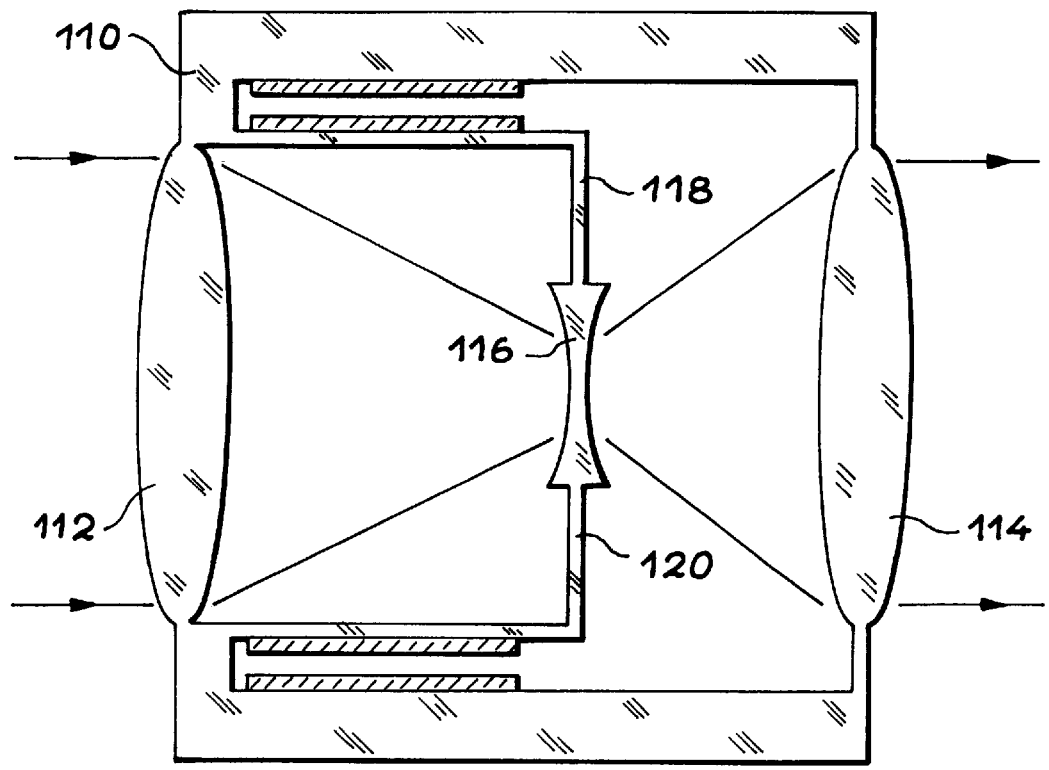
FIG. 11 shows an embodiment of the invention with a movable divergent lens.

The lenses, and particularly the movable lens, may be divergent. A device using a divergent lens is shown in FIG. 11. In addition to the stationary substrate 110 of the microdevice, this device comprises two stationary lenses 112, 114 positioned on the input and output of the microdevice. The movable section comprises a movable divergent lens 116, connected by two fastening arms 118, 120 to stationary section 110. This type of device may be useful for deflecting a beam with a large diameter; rather than displacing a convergent lens with a large diameter (i.e. heavy), the beam may be focused onto one or more smaller divergent lenses 116.

All the structures described above with reference to FIGS. 4 through 11 may also incorporate, in the stationary section of the microdevice, an optical guide, an optical fiber or a microlaser as described with reference to FIGS. 1 through 3. For example, the stationary section of the microdevice shown in FIG. 4 may be equipped with a cavity housing a microlaser together with a groove to receive an optical fiber that transmits the pumping beam to the microlaser.

An example of a procedure for making a microdevice according to the invention will now be described. Components made of silica will be used to illustrate the procedure. The basic material consists of a thick layer (approximately 50 μm) of silica disposed on a substrate that may, for example, be made of silicon. The deposit may be applied using LPCVD or PECVD (plasma-enhanced chemical vapor deposition) technology.

A resin layer is then applied to the silicon layer. Standard photolithographic techniques are then used to apply to the resin the shapes of the stationary and movable lenses and the fastening arms to be cut into the silica layer. An engraving phase then cuts the arms and lenses in the silica layer. This can be effected using reactive ionic engraving (RIE) techniques. The gases (e.g. $CHF_3$ for the silica and $0_2$ for the resin) react with the materials to be engraved forming volatile compounds that are removed by a pump system. By controlling the proportions of these gases the selectivity S of the engraving can be determined. S is the ratio of the substrate engraving speed to the resin mask engraving speed. This gives the engraving a high degree of verticality.

Cavities 21 (FIG. 1B) and 34 (FIG. 3) can be created during this reactive ionic engraving phase, as can electrostatic comb 84 (see FIG. 9).

A subsequent isotropic engraving phase of the silicon layer is used to cut out the moving parts (microlenses and fastening arms) to the required shape. Any shape may be cut and the above technique can produce the various components already described with reference to FIGS. 1A through 11.

It is also possible to make the movable lens out of a layer consisting of deposits of various materials or a progressively doped layer; this produces a lens with an index gradient. For example, a silica lens may be doped with phosphorus. The shape of the lens may, for example, be defined using reactive ionic engraving techniques. The creation of lenses with an index gradient is described, for example, in the Melles Griot catalog "Optics Guide 5", pp. 20–58, 20–59, 20–60 (produced using thin layer technology and varying phosphorus doping during PECVM deposition of silica).

Where a guide 10 is required in the stationary structure (e.g. in FIG. 1A), this is created during the phase in which the layer of, for example, silica in which the lenses and arms are to be cut, is deposited. A procedure for creating such a guide therefore consists in:

depositing a first layer of silica, depositing a layer of doped silica on the first layer of silica, engraving the layer of doped silica in the shape required for guide 10, depositing a second layer of silica.

The final layer, obtained by depositing the first and second layers of silica, may then be engraved as described above to create the lenses and arms.

The electrostatic control electrodes are made using techniques of evaporation under oblique incidence using a mechanical mask. The metal coatings thus produced are then connected to control electrodes.

If a Fresnel lens is required, the above procedure may be used; only the shape of the mask needs to be modified.

Figure 12:
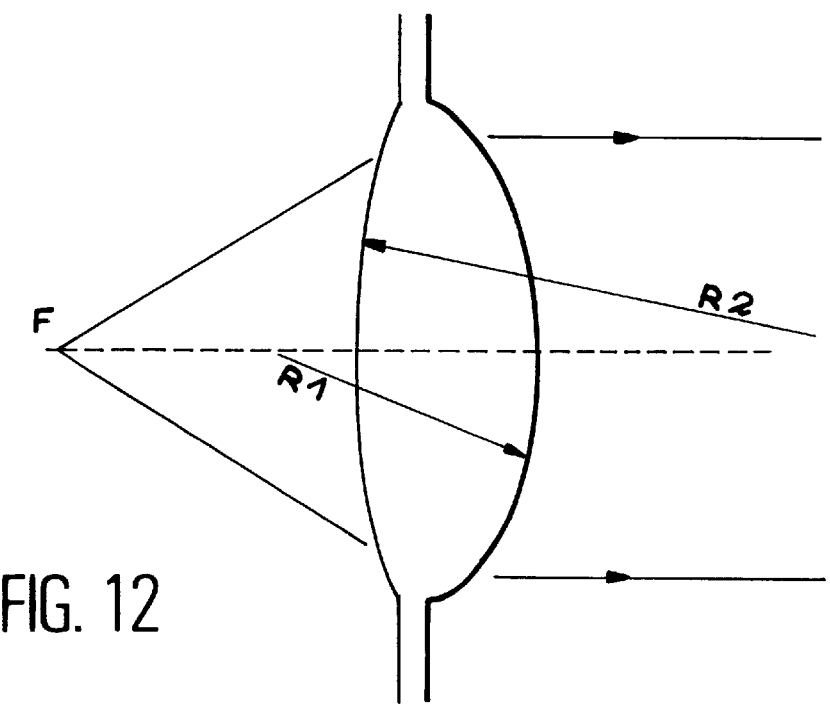
FIG. 12 is an example of a lens with two spherical diopters.

An example of an embodiment of a microdevice according to the invention will now be described. Typical deflection performances of microscanning devices are of the order of $-10°$ to $+10°$. If a beam of diameter $\Phi=100$ μm is considered, the known art enables plane-convex microlenses to be made whose central thickness is approximately $h=10$ μm and whose focal length $f$ is given by:

$$f=\Phi^2/8 \times h(n-1)$$

where n is the refractive index of the material (n=1.5 may be taken for silica). Taking the above values gives: $f=250$ μm. A displacement $d$ of the lens must now be generated; this displacement is given by: $d=f \cdot tg\theta=44$ μm. If, for example, a lens is made with two spherical diopters having radii of curvature $R_1$ and $R_2$ respectively (see FIG. 12), the condition $R_2=6R_1$ gives minimum spherical aberrations. Taking a focal length of 100 μm gives:

$R_1=(7(n-1)/6)f=58.33$ μm and $R_2=-6R_1=-350$ μm.

The displacement to be generated is therefore $f \cdot tg\theta=17.6$ μm.

The value obtained is considerably lower than the 44 μm required to obtain the same performances using a plane-convex microlens according to the prior art.

Lastly, as concerns the means of controlling the displacement of the fastening arms of the movable lens, the electrostatic control device is particularly advantageous. Taking an arm of length $L=2$ mm, width $l=5$ μm and thickness h, with a metal coating electrode deposited on the surface S of length L and height h, and if the distance $e$ between the metal coating on the arm and the metal coating on the stationary section is three times the displacement d of the arm, where the assembly has been made of PECVD silica with a Young's modulus $E=7.10^{10}$ Pa, the voltage V required to generate the displacement d is given by:

$$V=(12Ed^3l^3)/\epsilon_0 L^4)^{1/2}$$

For a device constructed according to the prior art V=250 volts. For a device constructed according to the invention, V=64 volts assuming that electrodes are fitted to both arms. The voltage gained is therefore greater than 4, which is very important in the field of microdevices where it is essential to be able to use low power supplies that can provide low or medium voltages.

Generally speaking, a microdevice constructed according to the invention measures something of the order of a few μm×a few μm×0.5 mm.

I claim:

1. An integrated optomechanical microdevice comprising:

a stationary section defining a plane of the microdevice;

at least one primary lens formed from the stationary section and movable in the plane and capable of deflecting a light beam in the plane;

wherein at least one of the primary movable lenses is a cylindrical lens having an axis of cylindrical symmetry perpendicular to the plane;

at least one first arm also formed from the stationary section to support the at least one primary lens for movement relative to the stationary section; and wherein at least one part of the at least one first arm is formed to be capable of displacement to move the at least one primary movable lens in the plane.

2. The integrated optomechanical microdevice of claim 1, further comprising at least one secondary lens located in the trajectory of the light beam.

3. The integrated optomechanical microdevice of claim 2, wherein the at least one secondary lens is stationary.

4. The integrated optomechanical microdevice of claim 2, wherein the at least one secondary lens is movable and capable of deflecting the light beam in the plane and is connected by at least one second arm to the stationary section, wherein at least one section of the at least one second arm is capable of displacement to move the at least one secondary movable lens in the plane.

5. The integrated optomechanical microdevice as claimed in any of the preceding claims, wherein there are N moveable primary lenses disposed side by side.

6. The integrated optomechanical microdevice of claim 5, wherein there are N moveable secondary lenses disposed side by side.

7. The integrated optomechanical microdevice as claimed in any of claims 1 to 4, wherein there are N primary lenses disposed in a stack along an axis in the plane.

8. The integrated optomechanical microdevice as claimed in any of claims 1 to 4, wherein at least one of the primary movable lenses is a Fresnel lens.

9. The integrated optomechanical microdevice as claimed in any of claims 1 to 4, wherein at least one of the primary or secondary lenses is a divergent lens.

10. The integrated optomechanical microdevice as claimed in any of claims 1 to 4, wherein the cylindrical lens has a diopter whose cross-section in a plane perpendicular to the axis of cylindrical symmetry is circular, conic or quadric.

11. The integrated optomechanical microdevice as claimed in any of claims 1 to 4 in which the stationary section of the device comprises means for directing a light beam in the direction of the primary movable lens or lenses, or the secondary lens or lenses.

12. The integrated optomechanical microdevice of claim 11, wherein said means for directing a light beam include an optical microguide built into the stationary section with an output end disposed opposite the primary movable lens or lenses, or the secondary lens or lenses.

13. The integrated optomechanical microdevice of claim 11, wherein said means for directing a light beam include an optical fiber fastened to the stationary section with an output end disposed opposite the primary movable lens or lenses, or the secondary lens or lenses.

14. The integrated optomechanical microdevice as claimed in any of claims 1 to 4, in which a diode laser or microlaser is fastened inside the stationary section so that a laser beam is emitted in the direction of the primary movable lens or lenses, or the secondary lens or lenses.

15. The integrated optomechanical microdevice as claimed in any of claims 1 to 4, wherein the first arm is joined at both ends to the stationary section of the microdevice and includes an intermediate section integrated with the at least one primary movable lens, the intermediate section being flexible so as to allow the at least one primary moveable lens to move in the plane.

16. The integrated optomechanical microdevice as claimed in any of claims 1 to 4, further comprising means for controlling displacement of the first arm and the at least one primary movable lens.

17. The integrated optomechanical microdevice of claim 16, wherein said means for controlling comprise electrostatic or electromagnetic means.

18. The integrated optomechanical microdevice of claim 16, wherein said means for controlling include an electrostatic comb.

19. A microdeflector comprising an integrated optomechanical microdevice including:

a stationary section defining a plane of the microdevice;

at least one primary lens formed from the stationary section and movable in the plane of the microdevice and capable of deflecting a light beam in the plane;

wherein at least one of the primary movable lenses is a cylindrical lens having an axis of cylindrical symmetry which is perpendicular to the plane of the microdevice;

at least one first arm also formed from the stationary section to support the at least one primary lens for movement relative to the stationary section; and wherein at least one part of the at least one first arm is capable of displacement to move the at least one primary movable lens in the plane.

20. The microdeflector according to claim 19, further comprising at least one secondary lens located in the trajectory of the light beam.

21. The microdeflector according to claim 20, wherein the at least one secondary lens is stationary.

22. The microdeflector according to claim 20, wherein the at least one secondary lens is movable and capable of deflecting the light beam in the plane and is connected by at least one second arm to the stationary section, wherein at least one section of the at least one second arm is capable of displacement to displace the at least one secondary movable lens in the plane.

* * * * *